United States Patent Office 3,515,673
Patented June 2, 1970

3,515,673
CHELATING AND CLEANING COMPOUND
AND METHOD
Paul W. Kersnar and Samuel Taormina, San Francisco,
Calif., assignors to Progressive Products Co., a corporation of California
Continuation-in-part of application Ser. No. 578,963,
Sept. 13, 1966. This application July 10, 1967, Ser.
No. 652,183
Int. Cl. C11d 7/32
U.S. Cl. 252—152
1 Claim

ABSTRACT OF THE DISCLOSURE

A chelating and cleaning composition comprising an alkali metal salt of the carboxymethylated reaction product of 1 mol of ethylene diamine and about 2.0 to 3.5 mols of propylene oxide (the optimum ratio being about 2.8 to 3.3). There are at least two terminal and most effectively, three terminal beta hydroxy propyl groups, with the remaining terminal group or groups acetate groups. Such product, advantageously the monosodium salt of tris (beta hydroxy propyl) ethylene diamine monoacetic acid, exhibits markedly improved metal chelating properties, especially for ferric iron ions in environments of relatively high pH, as well as manganese, nickel, chromium and copper ions, all of which form insoluble hydroxide precipitates at high pH. It is advantageously useful in preventing iron precipitation on fabrics during laundering, in removing precipitated iron stain from fabrics, as well as other iron ion sequestering applications. It is also useful, in combination with other chelates, as an improved detergency booster, and in combination with water-soluble salts of iron or manganese for agricultural purposes.

---

This application is a continuation-in-part of applicants' copending application, Ser. No. 578,963, filed Sept. 13, 1966, now U.S. Pat. No. 3,454,647 for "Bis(Beta Hydroxy Propyl) Ethylene Diamine, and Method of Preparation," which discloses but does not claim the bis chelating compound hereof.

This invention relates to new compounds particularly adapted for chelating or sequestering, metal ions, such as manganese, nickel, chromium, copper, and especially ferric iron ions, which compounds are effective in solutions varying widely in pH, and which are particularly effective in chelating such ions at a relatively high pH even through these ions form insoluble hydroxide precipitates at a relatively high pH. The compounds are also useful as a detergent booster in the general cleaning of material.

BACKGROUND OF THE INVENTION

Diethanol amine compounds containing a single beta hydroxy propyl group (hereinafter sometimes designated as BHP group) namely,

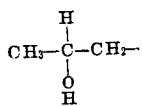

and three acetate groups are known to be useful as chelating agents, as disclosed in U.S. Pat. 2,806,060, to Bersworth et al., dated Sept. 10, 1957. However, in such type of compounds, the BHP group is not a terminal group but is a linking or bridging group. U.S. Pat. No. 2,697,113, to Lundsted et al., dated Dec. 14, 1954, discloses a totally hydroxy propylated ethylene diamine, as a surface active or cleaning agent but in this compound, since it is totally propylated, all four BHP groups are attached to the two nitrogen atoms (two to each atom). Thus in this compound, there is no available hydrogen attached to nitrogen for reaction with functional carboxymethylating groups.

SUMMARY OF THE INVENTION

It has been found pursuant to this invention that superior chelating of metal ions such as iron, manganese, nickel, chromium and copper, and particularly the ferric iron at a relatively high pH in the range of up to 12.5 and above, is more effectively obtained by the presence of at least two terminal BHP groups and advantageously three such groups attached to nitrogen of beta hydroxy propyl ethylene diamine (hereinafter sometimes designated as BHPED), with the remaining terminal groups being acetate groups. Such product has the following generic formula:

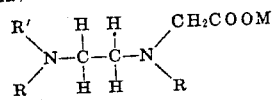

wherein R is the terminal beta hydroxy propyl group ($CH_3CHOHCH_2-$), and R' is a like terminal beta hydroxy propyl group or another $-CH_2COOM$ group wherein M is an alkali metal; such product being essentially a mixture of the disodium salt of bis BHPED diacetic acid and the monosodium salt of tris BHPED monoacetic acid, resulting from the reaction of (A) about 2.0 to 3.5 mol of propylene oxide and 1.0 mol of ethylene diamine, reacted with (B) about 2.0 to 0.5 mol of monochloroacetic acid per mol of ethylene diamine in the presence of alkali metal hydroxide in the molar ratio of about 2.0 to 1.0 to the monochloroacetic acid. The most advantageous specific compound is the sodium salt of tris BHPED monoacetic acid having the following formula:

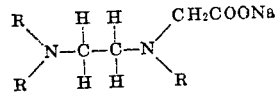

wherein R is a terminal beta hydroxy propyl group.

As disclosed and claimed in applicants' copending application, Ser. No. 476,193, filed July 30, 1965, for "Cleaning Composition, Intermediate for the Preparation Thereof, and Process of Making Same," the intermediate for the products of the present invention are obtained by first preparing the reaction product between one mol of ethylene diamine and about 2.0 to 3.5 mol of propylene oxide under non-forcing conditions, by providing an aqueous solution of ethylene diamine and gradually introducing the propylene oxide into the solution.

After preparation of such intermediate, the salts hereof are readily obtained by reacting the intermediate with monochloroacetic acid in the presence of an alkali metal hydroxide, in the ratio of about 0.5 to 2.0 mols of the acid to one mol of ethylene diamine with the molar ratio of alkali metal hydroxide to acid about 2 to 1. The formation of such salts is readily obtained by conventional carboxymethylation, or one step or two step cyanomethylation procedures; the simple carboxymethylation procedure being preferred.

Not only do the resultant products provide markedly improved chelation of iron under varying pH conditions, but they also are particularly effective in chelating other metals which form insoluble hydroxide precipitates at a high pH, such as, manganese, nickel, chromium and copper. Thus the products find important applicability in fertilizers under alkaline conditions for rendering iron and manganese readily available to plants to prevent or cure plant chlorosis.

Although the products of this invention do not effectively chelate calcium and magnesium ions at relatively high pH, they can be effectively used in aqueous solution in combination with the alkali metal salts of the ethylene diamine tetraacetate type (EDTA) which are known calcium and magnesium chelating agents, to thus provide a composition which will remove calcium and magnesium ions, and at the same time possess detergent boosting properties imparted by the compounds hereof.

DETAILED DESCRIPTION

Reference will be made to the accompanying drawings for a more detailed description of the invention, in which.

Figure 1:
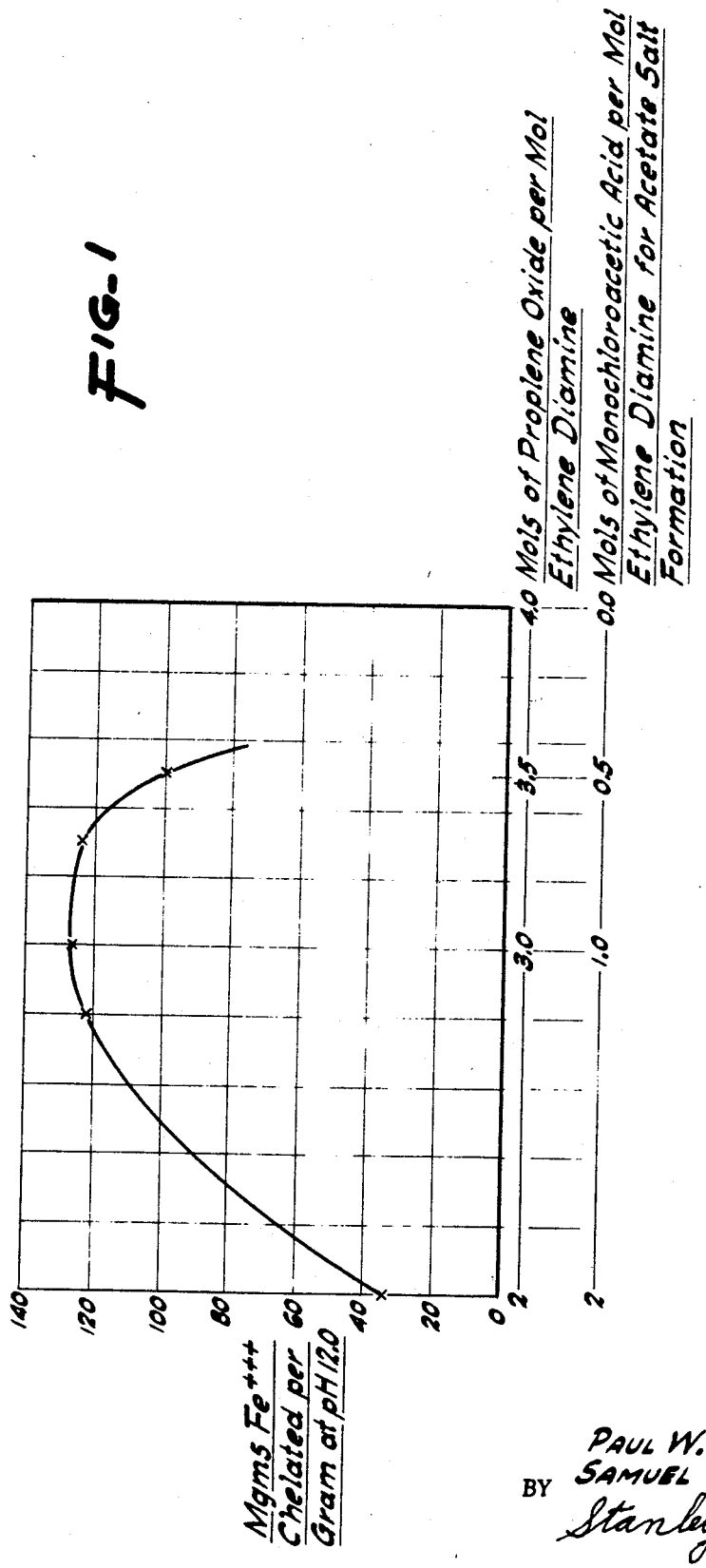
FIG. 1 is a graph illustrating the molar ratios of reactants for obtaining optimum chelation of iron.

As is disclosed in the aforementioned copending application, Ser. No. 476,193, the reaction product of ethylene diamine and propylene oxide, which are both liquids, in an aqueous vehicle proceeds exothermically and is extremely violent unless carefully controlled. One of the bonds in the epoxy group of the propylene oxide molecule splits and combines with a hydrogen atom attached to a nitrogen atom of an ethylene diamine molecule, and forms a hydroxy group; and the nitrogen from which such hydrogen has migrated becomes attached to the carbon atom of the epoxy group from which the bond has split. This reaction in equal molar ratios may be expressed theoretically as follows:

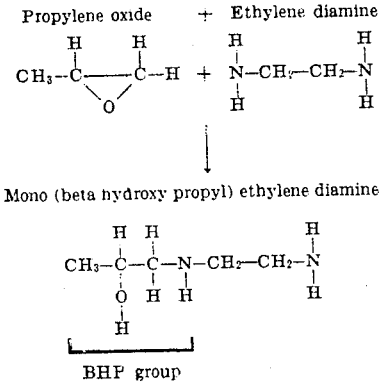

forming the reaction product mono (BHP) ethylene diamine.

However, although the above is the theoretical reaction, the mono compound forms in liquid mixture with other (BHP) ethylene diamines, such as the bis, tris and tetra; and as the molar ratio of propylene oxide to ethylene diamine increases above 1 to 1, liquid mixtures of the bis, tris and tetra (BHP) ethylene diamines with the mono compound, are favored.

In the molar ratio of 2.0 to 3.5 mols of propylene oxide to 1 of ethylene diamine, the reaction products will be predominantly a mixture of bis (BHP) ethylene diamine and tris (BHP) ethylene diamine with only minor amounts of the mono and tetra compounds formed. At the about 2 to 1 ratio, more of the bis compound forms than the tris, while at the molar ratio of about 3 to 1, which is the most effective intermediate compound hereof, it has presently been found that the predominant resulting reaction product (about 75 to 80% by weight) is tris (BHP) ethylene diamine.

It is a mixture consisting predominantly of the tris compound that provides the intermediate for obtaining the most effective acetate salt hereof; and it has been found pursuant to this invention that to obtain this predominant tris compound, the intermediate should be prepared by reaction of about 2.8 to 3.3 mols of propylene oxide with one mol of ethylene diamine. The formation of a totally propylated compound, namely, tetra (BHP) ethylene diamine should be avoided because even though such compound has four terminal beta hydroxy propyl groups which groups have been found very effective in providing chelating properties of the compounds hereof, there is no hydrogen available for the carboxymethylation reaction combination with the intermediate. Consequently, a totally propylated product has substantially no chelating effect on metallic ions.

In forming the acetate salt of the intermediate, sufficient chloroacetic acid should be reacted in the reaction to split off all the available hydrogen attached to nitrogen of all the BHP ethylene diamines in the mixture thereof. Thus, with an intermediate molar ratio of 2.8 to 3.3 mols of propylene oxide to 1.0 of ethylene diamine, the amount of acid should be sufficient so that 1.2 to 0.7 mols of acid to 1.0 mol of ethylene diamine, respectively, enter into the reaction. Likewise, with the wide range of 2.0 to 3.5 mols of propylene oxide to 1.0 mol of ethylene diamine, 2.0 to 0.5 mols of acid, respectively, per mol of ethylene diamine, should enter into the reaction.

Figure 2:
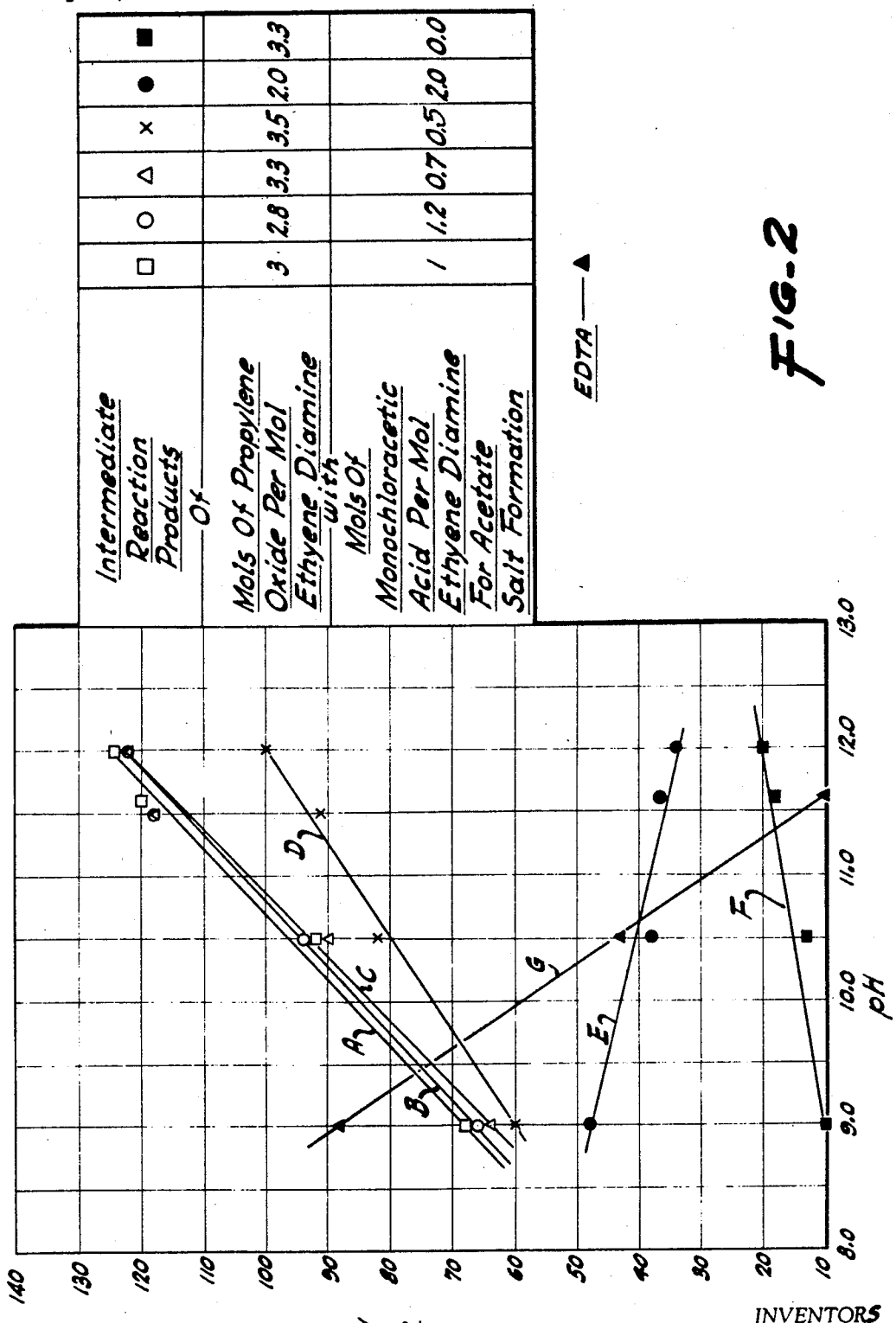
FIG. 2 is a graph comparing the iron chelation efficacy of different molar ratios of reactants providing applicants' products, and also a comparison of the efficacy of such products with a well-known chelating agent, namely, the tetrasodium salt of ethylene diamine tetra-acetate (EDTA).

Although the advantageous molar ratio for most effective iron chelation is in the range of about 0.7 to 1.2 of monochloroacetic acid, to 1.0 of ethylene diamine, and 3.3 to 2.8 mols of propylene oxide to 1.0 of ethylene diamine, it will be noted, with reference to the graphs of FIGS. 1 and 2, that even though the propylene oxide to ethylene diamine ratio drops as low as 2 to 1, some chelation of iron, particularly ferric iron, in the high pH's of 11 and above is obtained. However, absent acetate groups, there is very little chelation even with a molar ratio of 3.3 of propylene oxide per mol of ethylene diamine. This demonstrates the efficacy of the presence of the terminal BHP groups with acetate groups, in providing the effective property of the molecule toward iron chelation.

In the graph of FIG. 1, the abscissa represents both mols of propylene oxide per mol of ethylene diamine, and mols of monochloroacetic acid per mol of ethylene diamine plotted against milligrams of ferric iron ($Fe^{+++}$) chelated in aqueous solution per gram of active (on basis of only chelate) chelate in the solution at the high pH of 12. The standard test for chelation of ferric iron was employed, which consists in measuring the concentration at which the product will prevent the precipitation of ferric hydroxide from aqueous ferric chloride solutions. It will be noted that the greatest chelation efficiency was in the range of about 2.8 to 3.3 mols of propylene oxide to one mol of ethylene diamine, while the monochloroacetic acid ratio varied from about 1.2 to 0.7, to 1.0 of ethylene diamine.

With reference to the graph of FIG. 2 which is discussed in greater detail hereinafter in connection with the examples, various molar ratios of the products hereof are plotted as to iron chelating efficiency under varying alkaline pH's. The pH values are on the abscissa, and the ordinate represents milligrams of ferric iron chelated per gram of active chelate. Curve A is for the product of this invention resulting from the reaction of 3.0 mols of propylene oxide and 1.0 of ethylene diamine, and one mol of monochloroacetic acid; curve B, 2.8 to 1.0, and 1.2 acid; curve C, 3.3 to 1.0, and 0.7; curve D, 3.5 to 1.0, and 0.5; curve E, 2.0 to 1.0, and 2.0; curve F, 3.3 to 1.0, and no acid to form the acetate salt; and curve G, for the tetra sodium salt of ethylene diamine tetra acetate (well-known EDTA).

As previously related, the BHPED hereof is prepared in accordance with the method disclosed in the aforementioned copending application wherein an aqueous solution of ethylene diamine is provided, the propylene oxide is gradually mixed into the solution, and the reaction is allowed to proceed solely exothermically and under atmospheric pressure under nonforcing conditions while the temperature is maintained at below about 70° C. by extraneous cooling. Desirably, the amount of ethylene diamine initially in the solution should not exceed 35 percent by weight of the solution, and may be as low as 0.25 percent by weight.

The alkali metal acetate salt of the intermediate is preferably obtained by simple carboxymethylation whereby after formation of the intermediate, sodium hydroxide or any other alkali metal hydroxide is added and monochloroacetic acid gradually added; the molar ratio of the alkali metal hyroxide being sufficient to effect complete carboxymethylation and conversion of substantially all of the acid to the alkali metal salt. Hence, the molar ratio of alkali metal hydroxide to acid should be at least 2 to 1.

In the addition of such acid, reaction is expedited by heat and consequently, it is allowed to proceed exothermically at about 180° F. However, care should be taken that the reaction does not exceed about 190° F. Otherwise, the product will become excessively discolored but the temperature is not critical insofar as efficacy of the compound is concerned.

After all the monochloroacetic acid is added, the mixture is agitated until the reaction is complete, which will be in about ½ to 1½ hours. Completion of reaction can be readily ascertained in a conventional manner by titration for sodium chloride. The sodium chloride can remain in the product or can be removed, if desired.

Although the sodium salt is prepared by this method, and is preferred for reasons of economy and availability, any other alkali metal or amine salt having desired solubility in water solutions can be employed.

Should it be desired to prepare the solid bis BHPED, and carboxylate the solid compound, it is prepared by reacting 1.0 mol of ethylene diamine with 2.0 mols of propylene oxide in accordance with the nonforcing method disclosed in applicants' application, Ser. No. 578,963, filed Sept. 13, 1966, of which the present application is a continuation-in-part, by starting with an initial concentration of ethylene diamine in water of about 35 to 75% by weight. This bis compound can then be reacted in an aqueous solution with monochloroacetic acid and alkali metal hydroxide as described, to form the dialkali metal acetate salt.

The property of iron chelation has important industrial applications. For example, in commercial laundering, even when iron is present in solution in the water at as low a concentration as 0.1 part per million, off-color work due to the precipitated ferric hydroxides on the fabric under the alkaline conditions (10.5 to 12.5 pH) encountered in laundry washing, is possible. If the iron content increases the off-color nature is proportionately aggravated. Further, since no subsequent operations in commercial laundry washing cycles are suitable for the removal of insoluble and dehydrated ferric hydroxides, the off-color due to iron build-up will become more and more pronounced in subsequent washings, and will, in fact, cause white fabric to turn yellower and yellower.

Pursuant to this invention, it is possible to prevent completely this off-color due to iron precipitates merely by the inclusion of the compounds of this invention in suitable amounts (usually about 55 parts per million (p.p.m.) active to 440 p.p.m. active) in the alkaline suds or, in other words, the cleaning composition of the conventional laundry wash formulation; the quantity required being dependent on the amount of iron present in the water; and in this connection, excesses are not harmful. Further, as will be brought out by the subsequent examples, it is possible to remove on repeated washings the off-color already caused by iron precipitation merely by the inclusion of the products of this invention in suitable amounts (usually about 100 to 1,000 p.p.m. active) in the alkaline suds operation of the conventional laundry wash formulation. The theoretical quantity of chelate required is 1 gm. (100% basis) for 0.124 gm. of ferric iron. Thus, theortically, only about 8 p.p.m. of chelate (100% basis) is required for each p.p.m. of iron. On a practical basis, however, it is desirable to use a substantial excess since exact conditions existing at the time of and contained in the suds operation are not predictable.

Precipitation of ferric hydroxide commences at pH's as low as 4.5. However, in the approximate pH range of 4.5 to 8.5, the ferric hydroxide precipitates are highly hydrated and are even soluble or sufficiently colloidal so as not to form insoluble or agglomerated precipitates on the fabric. In pH ranges exceeding 8.5, the ferric hydroxides become more and more insoluble as pH increases. Also, an increase in temperature will serve to dehydrate and thus promote precipitation of the ferric hydroxides. Consequently, since the products of this invention have improved efficiency at high pH's they are important as additives for the control of iron precipitation in any type of laundry detergent washes, either for home or commercial usages.

Although the products hereof are advantageous when used alone in aqueous solution for control of iron precipitation and the precipitation of other of the aforementioned ions at high pH, they can also be advantageously employed in aqueous solution with other chelating additives in detergent compositions.

In this connection, chelating compounds, such as salts of ethylene diamine tetraacetic acid and nitrilotriacetic acid, are known to be useful as additives to various detergent compositions. However, the use of such compounds is generally limited to but one useful contribution, that of softening hard waters. Additionally, some of these compounds, such as those derived from nitrilotriacetic acid, form chelates with calcium and magnesium that are relatively unstable at high pH's and high temperatures, thus nullifying their usefulness in many applications, such as commercial laundering. Further their chelating power for trace elements, such as iron, is virtually zero under such conditions of pH and temperature.

It has been found that the products of this invention will contribute measurably to the improvement of detergents used in laundering, such improvement being most efficacious when the products are employed with other known chelates, particularly the ethylene diamine tetraacetate type (EDTA). For example, the sodium salt of essentially tris (BHP) ethylene diamine monoacetic acid, as described herein, at about 8 to 15 parts by weight (active) when mixed with the tetra sodium salt of EDTA, at about 6 to 12 parts by weight (active) when used in water at about 0.0055 to 0.055% by weight, as an additive to most commercial and household detergents at their conventional or recommended concentrations, will improve detergency to a very perceptible amount as can be determined from whiteness comparisons, examination by ultra-violet light and by a "washover" count in commercial laundries.

For example, in one linen supply type laundry, using a mixture of 12 parts by weight of the essentially tris a BHP ethylene diamine and 10 parts by weight of the tetra sodium salt of EDTA as an additive to the regular wash formula at about 0.011% by weight in the water, it was found that "washover" loads on bib aprons were reduced by 1½ to 2 loads per week, that "washover" loads in napkins were cut from 3½ to 1.9 per week, that whiteness retention was improved on all classifications, that a fuel saving of about 300,000 to 400,000 B.t.u.'s per load was realized due to elimination of hot flushes and that regular supply consumption was cut by ⅓ for alkali builders, ½ for soap and ⅓ for hypochlorite bleach. In addition, the use of sodium tripolyphosphate as an adjunct to the wash formula was completely eliminated. This improvement was over and above results normally obtained from a well-researched linen supply wash formula that utilizes soft, hot water, sodium metasilicate as an alkali builder, sodium tallow soap, sodium tripolyphosphate as a sequestrant and soap regenerator, and sodium silacofluoride as a neutralizing sour.

In any laundering process it is not possible to wash in completely soft or demineralized water, for even though the water used be of a distilled grade, the soils brought into the bath will contain varying quantities of elements that cause hardness, such as calcium and magnesium, and that cause off-color, such as iron and magnesium. Although the products of this invention will not effectively chelate elements such as calcium or magnesium at high pH and temperature, other calcium and magnesium chelates, notably the tetra sodium salt of EDTA, supply the lack in calcium and magnesium chelating power of the products hereof, and in suitable proportions, desirably in the range noted above, will contribute measurably to the detergency, whiteness retention and stain removal properties of any conventional detergent system. The advantages so obtained will become more apparent from the examples described hereinafter.

A further important use for the products hereof is in agricultural applications for rendering certain metal ions readily available to plants in soluble form.

As has been discussed previously, elements, such as iron and manganese, can precipitate as insoluble hydroxides at relatively low pH values. As a result these trace elements that are vital to plant growth will often not be available in soluble form. This can and does result in a condition known as chlorosis.

Because of this it has become a practice in agricultural fertilizers to form chelated salts of iron, manganese, zinc, etc. which are added to the soil to provide a soluble form of these trace elements. However, as the pH of the soil increases, such as in the case of alkaline soils particularly in the Southwest United States, pH 10–11.5, chelates heretofore employed lose their ability to hold these elements in soluble form, or the quantity of chelate required to hold an adequate amount of the element in soluble form is excessive. Pursuant to this invention it has been found that in a high pH range of 10–11.5 sufficient iron and manganese can be held in soluble form so as to provide enough of these trace elements for the care and prevention of chlorosis in plants without the excessive use of chelating agent.

All that is necessary to accomplish this is to mix the products of this invention (preferably the sodium salt of BHP ethylene diamine monoacetate) with water-soluble salts of iron and manganese, such as ferric or ferrous sulfate and manganese sulfate, in aqueous solution, and to further dilute this stock solution to the usual concentration employed in agricultural sprays, namely about 0.01 to 1.0% by weight of corrective metal element, as disclosed in U.S. Pat. 2,929,700, and apply as a spray or in irrigant waters to the soil around the plants. In this connection, it is only necessary to employ sufficient of the sodium salt of BHP ethylene diamine to chelate and hold the nutrient metal in solution in the higher pH ranges, as set forth in subsequent examples.

PREPARATION OF PRODUCT AND CHELATING TESTS

EXAMPLE I

The disodium acetate salt of predominantly bis N-N' BHP ethylene diamine–N-N' diacetic acid was prepared as follows:

60 kg. of ethylene diamine were mixed with 595 kg. of water in a suitable vessel equipped with an agitator and external water-cooling coils, and reacted under non-forcing conditions with 116 kg. of propylene oxide which was gradually introduced into the vessel over a period of about 2½ hrs., and while the temperature was maintained below about 55° C. to avoid decomposition products. The reaction proceeded exothermically, and was completed in about 3 hrs. as observed by a complete absence of boiling effect. The resulting product was an aqueous solution of B-hydroxy propyl substituted ethylene diamine (molar ratio essentially 2 BHP groups to 1 ethylene diamine) of about 22.7% by weight of the solution.

To this solution were added 160 kg. of sodium hydroxide (NaOH). The mixture was agitated under heat (merely to facilitate solution of the sodium hydroxide) until all the NaOH was dissolved. At this point, the temperature was adjusted to 120–130° F. to facilitate the subsequent reaction step. Then, 189 kg. of monochloroacetic acid (2 mols to 1 of ethylene diamine) were gradually added in increments in such a manner that the temperature was allowed to reach 180° F. to hasten the reaction, but not to exceed 190° F., to preclude discoloration of the product but the temperature is not functionally critical.

After all the monochloroacetic acid was added, the mixture was agitated until the reaction was complete (½–1½ hrs.). Completion of reaction was ascertained by titration for sodium chloride. The sodium chloride content was 10.44% upon completion. The percent by weight of desired product was about 30%, with the remainder of the solution salt and water.

The product as prepared above was subjected to the aforementioned standard test for chelation of ferric iron. The following results were obtained:

At pH 9, 1.0 gm. of product on a 100% active basis (3.3 grams of aqueous solution) chelated 48 milligrams of iron as $Fe^{+++}$ At pH 10.5—38 mgms. of $Fe^{+++}$ At pH 11.7—37 mgms. of $Fe^{+++}$ At pH 12.0—34 mgms. of $Fe^{+++}$ These are the values (FIG. 2) from which curve E is plotted.

EXAMPLE II

The monosodium salt of predominantly tris NN-N' BHP ethylene diamine N' acetic acid was prepared as follows:

60 kg. of ethylene diamine were mixed with 638 kg. of water in the same type of vessel as in Example I, and reacted with 174 kg. of propylene oxide gradually introduced over a period of 3.5 hrs. into the vessel under the same non-forcing conditions as in Example I. The reaction was completed in about 4 hrs. The resultant solution was essentially tris beta hydroxy propyl substituted ethylene diamine (molar ratio of 3 beta hydroxy propyl groups to 1 ethylene diamine) of about 26.8% by weight of the solution.

To this mixture was added 80 kg. of sodium hydroxide (NaOH). The mixture was agitated under heat as in Example I until the NaOH was dissolved. At this point, the temperature was adjusted to 120–130° F., and 94.5 kg. (1 mol) of monochloroacetic acid (1 mol to 2.0 sodium hydroxide) was then added in increments in such a manner that the temperature was allowed to reach 180° F. but not to exceed 190° F. for the reasons explained in Example I. After the monochloroacetic acid was added, the mixture was agitated until the reaction was compelte (½–1 hr.). Completion of reaction was ascertained as in Example I by titration for sodium chloride. The sodium chloride content was 5.6% upon completion. The percent by weight of desired product was about 30%.

The product as prepared above was subjected to the same standard test for chelation of ferric iron, as in Example I. The following results were obtained:

At pH 9—1 gm. of product on a 100% active basis chelated 68 milligrams of iron as $Fe^{+++}$ At pH 10.5—92 mgms. of $Fe^{+++}$ At pH 11.7—120 mgms. of $Fe^{+++}$ At pH 12.0—124 mgms. of $Fe^{+++}$ Such values (FIG. 2) are those for curve A.

Also, the product of this example was tested for chelation of manganese. At pH 10.6, 1 gram of product on a 100% active basis chelated 75 mgms. of $Mn^{++}$.

EXAMPLE III

In order to establish a ratio of propylene oxide per mol of ethylene diamine, and a concomitant ratio of monochloroacetic acid per mol of ethylene diamine, for the purpose of determining the optimum ratios for iron chelation, three additional products were prepared utilizing the methods of preparation and testing as in Examples I and II. These were:

(B) 2.8 mols of propylene oxide and 1.2 mols of monochloroacetic acid per mol of ethylene diamine;
(C) 3.3 mols, and 0.7 mol; and
(D) 3.5 mols and 0.5 mol.

The iron ($Fe^{+++}$) chelating values were similarly determined as milligrams of $Fe^{+++}$ chelated per gram of 100% active product as follows:

| At pH | 9.0 | 10.5 | 11.5 | 12.0 |
|---|---|---|---|---|
| B | 66 | 94 | 118 | 122 |
| C | 64 | 90 | 118 | 122 |
| D | 60 | 82 | 91 | 100 |

The above values are plotted as curves B, C and D, respectively, in FIG. 2.

Similar chelating values were determined at the same pH's for the intermediate reaction product of 3.3 mols of propylene oxide and 1.0 mol of ethylene diamine but which was not reacted with monochloroacetic acid, and the results are plotted as curve F (FIG. 2). Also, the same was done for the well-known chelating agent ethylene diamine tetra acetate (EDTA) at pH's of 9, 10.5 and 11.7; the results of which are plotted as curve G of FIG. 2.

The chelating efficiency of the acetate salt for the optimum range formed from the intermediate of 2.8 to 3.3 mols of propylene oxide to 1.2 to 0.7 of ethylene diamine, as indicated by curves A, B and C, is about the same, but it will be noted from curve D that as the molar ratio for acetate salt formation starts to decrease below 0.7 mol, efficiency decreases. However, in all the componds represented by curves A, B, C and D, efficiency increases with increase in pH; and by comparison with curve E (the diacetate of 2.0 mols propylene oxide and 2.0 mols ethylene diamine), it will be observed that although chelation occurs compared with EDTA (curve G), it is considerably below the optimum ranges. Curve F compared with curves A, B, C and D, reveals the importance of the sodium acetate groups in applicants' compounds.

As previously noted, the curve of FIG. 1, which represents tests run at the high pH of 12.0 for varying molar ratios of propylene oxide and ethylene diamine reacted with the monochloroacetic acid, establiesh the optimum efficiency at the optimum ratio of 2.8 to 3.3 mols of propylene oxide, and 1.2 to 0.7 of monochloroacetic acid for acetate salt formation, per mol of ethylene diamine.

LAUNDERING OPERATIONS

EXAMPLE IV

In order to establish the important properties of iron chelation under practical commercial laundering conditions the following test run was made.

Two 25 lb. loads of white cotton fabric were run, one in each side of a well-known commercial laundry washer, namely, a "Cook Twin Washette." For both sides, the water for the suds operation was mixed with ferric chloride so as to give a concentration of 5 parts per million of ferric iron ($Fe^{+++}$). A standard wash formula was employed, except that the product from Example II was added to one side and not the other. The following wash cycle and formula were used:

| Operation | Water level | Temp. (°F.) | Time (min.) | Supplies |
|---|---|---|---|---|
| (1) Suds | Low | 160 | 10 | Side 1. 4 oz. alkali 2 oz. soap. Side 2. Same as 1, plus ¼ oz. product from Example II. |
| (2) Rinse | High | 160 | 2 | None. |
| (3) Rinse | do | 160 | 2 | Do. |
| (4) Bleach | Low | 150 | 10 | ½ oz. dry bleach. |
| (5) Rinse | High | 160 | 2 | None. |
| (6) Rinse | do | 140 | 2 | Do. |
| (7) Rinse | do | 120 | 2 | Do. |
| (8) Sour | do | Cold | 2 | ¼ oz. sour (alkali neutralizer). |

The amount of chelate (product of Example II) used was 85 p.p.m., active in the water solution, or 17 to 1 based on iron content of 5 p.p.m. Theoretical quantity of chelate required is about 8.5 to 1, at the suds pH which was about 11.8.

After washing, the fabrics were extracted of water and tumble dried. Even before drying the yellow color due to iron precipitation was evident in those fabrics from Side 1 in which the chelating agent hereof was omitted. After drying, the fabrics as processed were compared with the original unprocessed fabrics. Those from Side 2 (containing chelating agent) were at least of equal whiteness; those from Side 1 had a distinct off-color, yellowish cast.

In a subsequent run, the procedure above was duplicated, except that the $Fe^{+++}$ content of the first two water rinses was also made up to 5 p.p.m. just as in the suds. No additional chelate was used. Final results were identical to the above.

Thus, even though the carry-over concentration of chelate in the two rinses drops well below the theoretical required (8.5 to 1), end even though the pH of the second rinse was 9.5 due to alkali carry-over, there was no iron precipitation in the fabric as the chelate prevented such precipitation. This correlates with laboratory observations in that the chelate hereof even though at a conecntration well below that to prevent ultimate precipitation is effective in controlling such precipitation for a short time. As can be seen from the wash formula, the rinses were of short (2 min.) duration.

EXAMPLE V

In order to test the efficiency of the chelate (product of Example II) under laundry plant conditions and also for the removal of already existing off-color work due to precipitated iron, a prolonged run was made in a hospital laundry whose water contained dissolved iron resulting from contamination from the boiler or water softener. The white cotton fabrics (bedspreads, sheets, towels, pillowcases, etc.) in this hospital had discolored (depending on the number of washings the linens had been given) ranging from yellowish-brown, through vivid yellow to slightly tinted pieces. When new replacement linens were put into service it was noted by the operating personnel of this laundry that they became noticeably discolored in two weeks or sooner under the conditions of usage and washing existing prior to this test run.

In running the test for removal of iron discoloration, the procedures and wash formulae were substantially the same as in Example IV, except that 8 oz. of chelate (liquid product from Example II containing about 30% chelate), were used in the soap-alkali suds bath per 100 lbs. of fabrics, dry weight. The concentration was 2.7 greater than that used in Example IV, in order to speed the removal of precipitated iron.

When the test run was started, a badly discolored bedspread was cut in half for use as a control. One half was retained in its original condition for comparison, and one half was washed repeatedly. After the first washing in a conventional manner but with chelate added, a preceptible difference was noted. After the fourth washing, the bedspread was white with no visible iron discoloration. It was estimated that about 2 weeks would be required in this hospital before all pieces would have been washed at least 4 times. At the end of two weeks general observation established that all work was substantially white.

At this time the dosage of the chelate (product from Example II) was dropped from 8 oz. to 3 oz. per 100 lbs. of fabric, dry weight, to observe whether or not prevention of iron precipitation would occur. After two additional weeks, no discoloration was observed, either on the control piece, on new linens put into service or on the linens from which iron discoloration had been removed.

EXAMPLE VI

Before the commencement of the described test of Example V a count of "washovers" (i.e. linens that were washed but had to be rewashed because soil or stains other than iron discoloration were still present) was made. The purpose of this was to determine whether or not the chelate (product from Example II) had any detergent boosting properties. Prior to the test it was found that in two weeks an average of 114 lbs. of fabric out 2,000 lbs. processed, or 5.7%, had to be rewashed. During the two-week period when the dosage of chelate was 3 oz. per 100 lbs. of fabric, dry weight, only an average of 13.4 lbs. per 2,000 lbs. or 0.67%, had to be rewashed, for nearly a ten-fold increase in detersive efficiency.

With respect to quantities discussed in the foregoing Examples IV, V and VI, it is the general practice in commercial laundering to relate the quantity of supplies to be used to the pounds of fabric dry weight to be washed. Thus, a detergent's usage may be prescribed as one pound per hundredweight of fabric. In household laundering it is common to designate the dosage as so many ounces or parts of a cupful per washing machine load. However, in laboratory testing it is common to express the quantity of supplies used as concentration by weight or volume in the water.

In commercial laundering the low level suds operation will require about 400-500 lbs. of water per hundred pounds of clothes. Thus, if one pound of material is prescribed, the concentration of that material would be 0.20-0.25% by weight in the water. Were it possible to accurately control all conditions it would also follow for example that the exact, theoretical quantity of chelate required for all the iron present in the water could be added, theoretically about 8 p.p.m. of the sodium salt of essentially tris BHP ethylene diamine monoacetate for each p.p.m of iron. However, due to the uncertainty of conditions and the time elements involved it has been found advantageous to use an excess of chelate, laboratory results notwithstanding, such that a concentration of about 0.01%–0.035%, active basis, of chelate is used, which represents about 3-8 ounces of a 35% aqueous solution per hundredweight of fabric.

PRODUCTS HEREOF WITH ADDITIVE

In the following Examples VII, VIII and IX, an aqueous solution which contains the sodium salt of essentially tris BHP ethylene diamine monoacetate at about 12% by weight and the tetra sodium salt of EDTA at about 10% by weight, can be used to boost detergency adequately at about 0.05% concentration as is by weight in waters of 0-75 p.p.m. hardness, and at about 0.1% at 75-150 p.p.m. of hardness. Using the relations hitherto established this means about 4 ounces and 8 ounces per hundredweight of fabric, respectively, in a commercial type washer, and about 1 to 2 tablespoons, respectively, in a household washer load.

EXAMPLE VII

In order to establish the efficacy as detergent boosters of mixtures of the sodium salt of essentially tris BHP ethylene diamine monoacetate and the tetra sodium salt of EDTA, the following aqueous solutions representing different ratios of these two materials, but each solution being of the same total active concentration, were prepared by merely adding the ingredients to water and stirring until homogeneous.

| No. | Water, gms. | Ingredient 1 Gms. | Ingredient 1 Percent active | Ingredient 2 Gms. | Ingredient 2 Percent active |
| --- | --- | --- | --- | --- | --- |
| A | 39.8 | 28.6 | 10.0 | 31.6 | 12.0 |
| B | 41.2 | 25.1 | 8.8 | 34.7 | 13.2 |
| C | 39.0 | 39.7 | 13.9 | 21.3 | 8.1 |
| D | 38.6 | 44.0 | 15.4 | 17.4 | 6.6 |
| E | 39.4 | 34.3 | 12.0 | 26.3 | 10.0 |

Ingredient 1.—35% aqueous solution of sodium essentially tris BHP monoacetate.

Ingredient 2.—38% aqueous solution of tetra sodium EDTA.

The ratios of active ingredients in the above preparations as ingredient 1 to ingredient 2 are as follows: A 1/1.2; B 1/1.5; C 1.7/1; D 2.3/1; and E 1.2/1.

Detergency tests were run using swatches soiled with natural humas type soil and carbon black. The base detergent used was a household cold water type (Cold Water All—Lever Bros.), at 0.20% concentration by weight. The products above were used as additives at 0.05 and 0.10% as is concentrations by weight. Tests were run at 140 degrees F. and in water at 50 p.p.m. and 150 p.p.m. total hardness. The following results were obtained, expressed as percent increases in soil removal over that obtained with the base detergent alone.

| Mixture | 0.05% conc. 50 p.p.m. | 0.05% conc. 150 p.p.m. | 0.10% conc. 50 p.p.m. | 0.10% conc. 150 p.p.m. |
| --- | --- | --- | --- | --- |
| A | 48 | 35 | 55 | 55 |
| B | 55 | 38 | 41 | 55 |
| C | 61 | 40 | 55 | 60 |
| D | 10 | 5 | 15 | 8 |
| E | 80 | 65 | 95 | 120 |

EXAMPLE VIII

Since the mixture E of Example VII proved to be the best ratio for detergency boosting it was used in the same detergency test at 0.05%, as is, concentration by weight with a series of several detergents, all at 0.20% concentration by weight and at 140 degrees F. in water of 50 p.p.m. total hardness. Again the results are expressed as percent increases in soil removal over that obtained by the basic detergents alone, namely:

|  | Percent increase |
| --- | --- |
| Tide by Procter and Gamble | 12.0 |
| Cheer by Procter and Gamble | 31.0 |
| Bold by Procter and Gamble | 41.0 |
| All by Lever Bros. | 18.0 |
| Commercial Detergent A | 36.0 |
| Commercial Detergent B (at 160° F.) | 50.0 |

Commercial Detergent A was Speedlite Hi-Marc which is a non-ionic synthetic type detergent built with sodium metasilicate and tetrasodium pyrophosphate.

Commercial Detergent B was Speedlite Matt which is a high titer tallow soap built with sodium orthosilicate and sodium tripolyphosphate.

EXAMPLE IX

Mixture E of Example VII was tested in a large linen supply plant on two problem classifications, namely, bib aprons and napkins. In this plant 550 lbs. of fabric are washed in each load. The normal wash formula and procedure consists of one warm (150 degrees F.) and six hot flushes (195 degrees F.) of 3 minutes each; one alkali break of 200 degrees F. utilizing 6 cups of dry alkali for 15 minutes; one suds operation utilizing ⅓ cup of dry alkali, 8 oz. of tripolyphosphate, and enough tallow soap to obtain a running suds at 195° F. for 5 minutes; one bleach suds operation utilizing 8 cups of bleach for 8 minutes; and a total of six rinses, three hot (195 degrees F.), one warm and two cold, each of 3 minutes. Despite this long and drastic treatment, about 40–45% of the bib aprons and about 30% of the napkins have to be rewashed in stain treatment loads.

Mixture E, Example VII, was added to the above described formula in the alkali break using 22 ounces and omitting the use of tripolyphosphate in the suds operation. It was immediately observed that only ½ the tallow soap previously used was required to obtain a good running suds. Both bib aprons and napkins showed an immediate improvement in whiteness retention. On subsequent runs the alkali addition was cut to about 4.5 cups and the bleach addition was cut to about 6 cups.

After 5 weeks a count of washovers showed a reduction from about 6 loads per week, average, to 4 to 4.5 loads per week, and napkin from 3.5 to about 1.9 per week. Both classifications showed a marked improvement in whiteness retention as compared to results from the standard formula and procedure in use previously. Also, two hot (195 degrees F.) flushes had been eliminated resulting in a fuel saving of about 300,000–400,000 B.t.u.'s per load.

AGRICULTURAL FORMULATION

EXAMPLE X

For use as chelates in agricultural applications the following test was run. To 6.6 gms. of the chelate product from Example II were added 0.9 gm. of ferric sulfate $[Fe_2(SO_4)_3 \cdot 9H_2O]$ and 0.26 gm. of manganous sulfate $(MnSO_4 \cdot 2H_2O)$, and the mixture was stirred until the solids dissolved. The PH of the solution was then adjusted to 10.6 (simulating high alkaline soil condition) by addition of sodium hydroxide. No precipitation was observed after 10 days standing. Thus, the composition without addition of the sodium hydroxide and when diluted to spray consistency, will hold and retain the nutrient metal ions in solution in alkaline soil, to render them available to plants.

What we claim is:

1. A chelating composition consisting essentially of an aqueous solution of the reaction product of (A) about 2.8 to 3.3 mols of propylene oxide and 1.0 mol of ethylene diamine consisting essentially of a mixture of mono, bis, tris and tetra (beta hydroxy propyl) ethylene diamine in which the tris compounds is predominant with (B) about 1.2 to 0.7 mols of monochloracetic acid per mol of ethylene diamine and an alkali metal hydroxide in the molar ratio to said monochloracetic acid of at least about 2.0 to 1.0, and which is essentially the monosodium salt of tris (beta hydroxy propyl) ethylene diamine monoacetic acid.

References Cited

UNITED STATES PATENTS 2,808,435  10/1957  Young ------------ 260—534

MAYER WEINBLATT, Primary Examiner

U.S. Cl. X.R.

8—137; 71—121; 252—99, 137; 260—534